United States Patent
Dwivedi et al.

(10) Patent No.: US 12,098,031 B2
(45) Date of Patent: Sep. 24, 2024

(54) ELEVATORS FOR MATERIAL HANDLING SHUTTLES

(71) Applicant: Amazon Technologies, Inc., Seattle, WA (US)

(72) Inventors: Rajeev Dwivedi, Sammamish, WA (US); Mohit Malik, Seattle, WA (US); Ganesh Krishnamoorthy, Seattle, WA (US); Vivek S. Narayanan, Franklin, TN (US); Michael Alan Bray, Elkhorn, NE (US)

(73) Assignee: Amazon Technologies, Inc., Seattle, WA (US)

( * ) Notice: Subject to any disclaimer, the term of this patent is extended or adjusted under 35 U.S.C. 154(b) by 311 days.

(21) Appl. No.: 17/516,181

(22) Filed: Nov. 1, 2021

(65) Prior Publication Data
US 2023/0138603 A1   May 4, 2023

(51) Int. Cl.
  *B65G 1/12* (2006.01)
  *B65G 1/04* (2006.01)

(52) U.S. Cl.
  CPC .............. *B65G 1/12* (2013.01); *B65G 1/0478* (2013.01); *B65G 1/0485* (2013.01)

(58) Field of Classification Search
  CPC ....... B65G 1/12; B65G 1/0478; B65G 1/0485
  See application file for complete search history.

(56) References Cited

U.S. PATENT DOCUMENTS

| | | | | |
|---|---|---|---|---|
| 4,071,150 A * | 1/1978 | Thompson | ............. | B65G 47/29 414/270 |
| 5,000,643 A * | 3/1991 | Tanaka | ............. | B65G 1/06 414/807 |
| 5,779,094 A * | 7/1998 | Stingel, Jr. | ............. | B65G 1/08 221/75 |
| 7,775,344 B2 * | 8/2010 | Balk | ............. | B65G 17/005 198/575 |
| 8,011,492 B2 * | 9/2011 | Davi | ............. | B65G 1/127 198/347.1 |
| 9,938,079 B1 * | 4/2018 | Vogel | ............. | B65G 47/5127 |
| 9,938,767 B2 * | 4/2018 | Kummer | ............. | E06C 7/12 |

(Continued)

FOREIGN PATENT DOCUMENTS

| | | |
|---|---|---|
| DE | 102022128583 A1 | 5/2023 |
| GB | 2610040 A | 2/2023 |

OTHER PUBLICATIONS

IPO, "Search Report" Application No. GB 2215508.9, mailed Apr. 18, 2023, 4 pages.

*Primary Examiner* — Saul Rodriguez
*Assistant Examiner* — Ashley K Romano
(74) *Attorney, Agent, or Firm* — Eversheds Sutherland (US) LLP

(57) ABSTRACT

Systems and methods are disclosed for elevators for material handling shuttles. In one embodiment, an example system configured to change elevation of a shuttle may include an elevator track disposed between a loading zone and an unloading zone, and a platform coupled to the elevator track and configured to move between the loading zone and the unloading zone. The platform may be configured to engage with a lower surface of the shuttle at the loading zone. The platform may be configured to lift the shuttle off a first set of rails at the loading zone, and to position the shuttle onto a second set of rails at the unloading zone.

20 Claims, 9 Drawing Sheets

(56) References Cited

U.S. PATENT DOCUMENTS

| | | | |
|---|---|---|---|
| 10,071,859 B2* | 9/2018 | Hellenbrand | B65G 11/163 |
| 10,994,941 B1 | 5/2021 | Dwivedi et al. | |
| 11,254,154 B1* | 2/2022 | Thammasouk | B41J 11/20 |
| 2002/0179555 A1* | 12/2002 | Pater | B65G 1/023 |
| | | | 211/151 |
| 2007/0276535 A1* | 11/2007 | Haag | B65G 1/0485 |
| | | | 700/217 |
| 2014/0114466 A1* | 4/2014 | Luo | E04H 6/24 |
| | | | 700/214 |
| 2016/0347544 A1* | 12/2016 | Kvifte | E06C 7/12 |
| 2020/0017313 A1* | 1/2020 | Mori | B65G 47/64 |
| 2020/0243363 A1* | 7/2020 | Yuasa | B65G 1/0457 |
| 2020/0277138 A1* | 9/2020 | Elazary | G06Q 10/087 |
| 2021/0299704 A1* | 9/2021 | Bell | B65G 47/54 |
| 2021/0362948 A1* | 11/2021 | Scarth | B65G 1/026 |
| 2021/0362950 A1* | 11/2021 | Austrheim | B65G 67/24 |
| 2022/0194699 A1* | 6/2022 | Looker | B65G 1/0464 |
| 2023/0055514 A1 | 2/2023 | Narayanan et al. | |
| 2023/0251667 A1* | 8/2023 | Serstad | G05D 1/0225 |
| | | | 701/26 |

* cited by examiner

ELEVATORS FOR MATERIAL HANDLING SHUTTLES

BACKGROUND

As users increasingly make online purchases, fulfillment of such purchases and other orders may become increasingly complicated. For example, a fulfillment center may have output of upwards of one million packages per day. With such demands, efficiency of logistics related to processing orders and packages may be important. For example, use of equipment to move or otherwise handle objects may improve efficiency. However, such equipment may create chokepoints or cause bottlenecks in fulfillment center operations. Accordingly, improvements in various operations and components of order fulfillment, such as improvements to picking technology, sorting technology, transport technology, packing technology, and so forth may be desired, such that manual efforts can be redirected to different tasks.

Figure 1:
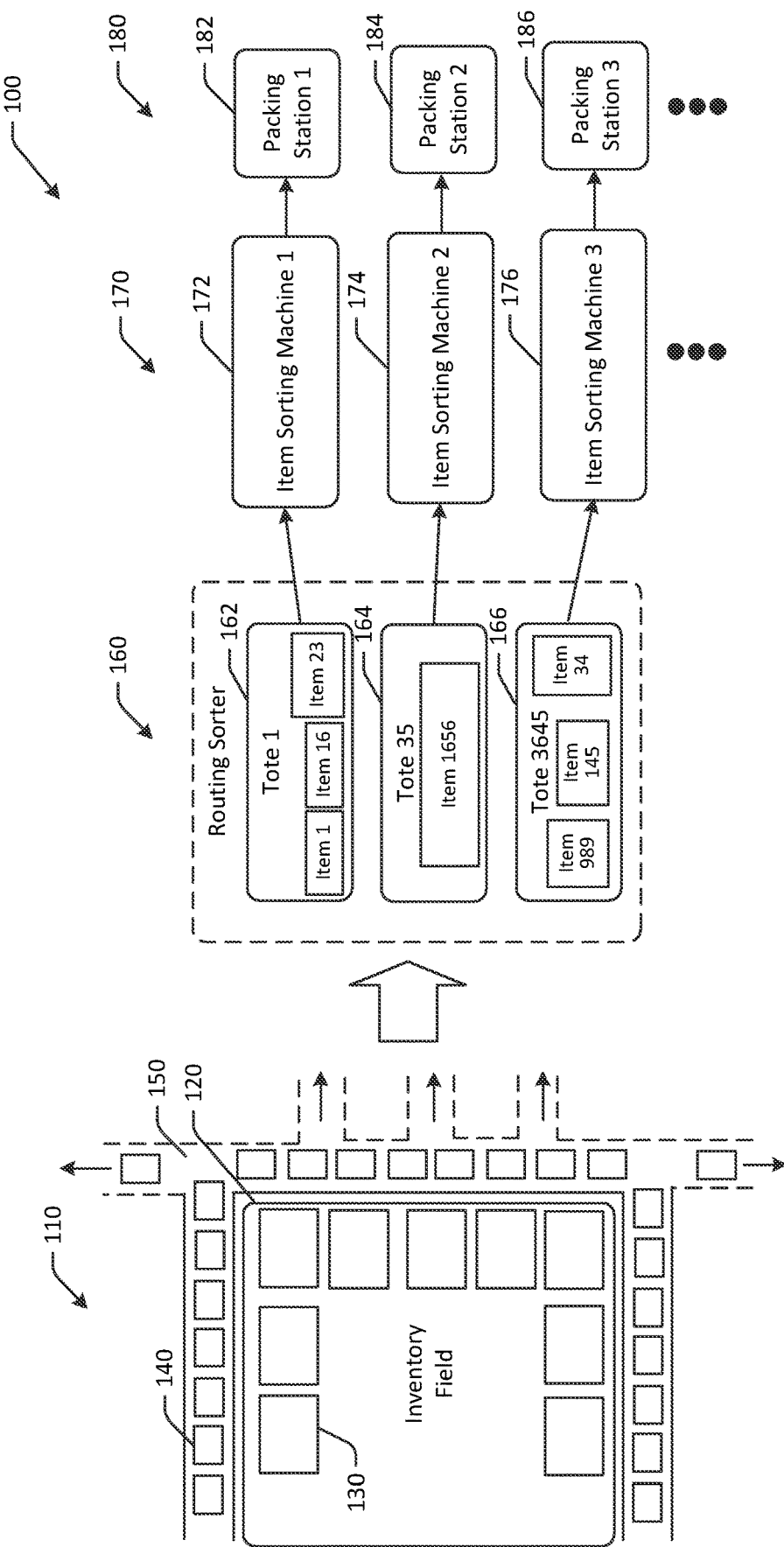
FIG. 1 is a hybrid schematic illustration of an example use case for elevators for material handling shuttles in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

Moving items or objects through a fulfillment center may require handling of the item itself. For example, picking the item from inventory, placing the item into a container, transporting the container, removing the item from a container, and so forth may all be examples of actions for which an item may need to be handled. Moreover, fulfillment centers may include lengthy conveyors that may be used to transport objects, such as packages, products, items, or other objects, as well as containers that may be at least partially full of objects. Transport of containers or items (e.g., individual items or multiple items, etc.) may involve the use of container shuttles that move on one or more rails to transport a container from one location to another. For example, a container of items may be loaded onto a shuttle, and the shuttle may transport the container from an inventory field to a sortation system or other location.

In addition, facilities may have equipment with more than one level (e.g., sortation systems with multiple levels of containers, etc.), and containers may therefore have to be transported across one or more elevation changes. Such elevation changes, particularly for shuttles transporting items and/or containers that may have items inside, may be difficult for automated systems due to a need for balancing and/or leveling to prevent items from falling off a shuttle, maintaining system throughput, space and/or footprint restrictions within a facility, and so forth.

For processing of items or packages, some systems may include multiple induction stations at which an item or package can be inducted into the system for downstream sortation. Such systems may include multiple sortation systems. Items may be routed from induction stations to sortation systems using shuttles. For example, items may be loaded into totes, and the totes may be transported using shuttles. Such systems may share shuttles across multiple sortation systems for high efficiency sortation of items. Therefore, systems and methods for automated elevation changes for shuttles may be desired.

In a typical warehouse environment, such as that illustrated in FIG. 1, items may be transported through various means such as conveyors, belts, shuttles, etc. as they undergo different operations like picking, sorting, storing, shipping/dispatch, and so forth. In some of these cases, containers may be used to transport items, either individually or in groups, from one location to another. For instance, transporting items from a pick station to a sort station may involve the item(s) being picked into a container, such as a tote, which may then be transported via a shuttle.

Embodiments of the disclosure may include systems configured to perform such elevation changes for shuttles, while maintaining horizontal orientation of the shuttles during the elevation change to prevent loss of items from the shuttle. Some embodiments include synchronized elevator platforms that provide a smooth transition and shuttle travel across multiple levels. Certain embodiments may include reciprocating lift-like arrangements that avoid subjecting shuttles to rapid acceleration. Some embodiments may be unidirectional elevators that allow for smooth transport. Embodiments may include alignment features at loading and unloading zones that allow for integration with a moving platform and maintain accurate shuttle placement across different sets of rails. As a result, shuttles can be transported across different elevations without loss of payload and/or inaccurate shuttle positioning when reengaging with rails of the system on different levels. Some embodiments include optimized process flows for processing of orders at fulfillment centers, as well as process flows or methods to increase speed of consolidating products in a multi-item order as a result of improved speed in placing items into containers and removing items from containers. As a result, throughput of fulfillment centers may be improved, and/or logistics of fulfillment center operations may be less complicated.

Referring to FIG. 1, an example use case 100 for elevators for material handling shuttles is depicted in accordance with one or more embodiments of the disclosure. Although discussed in the context of online orders, other embodiments may be directed to any suitable use case where containers or items are transported, such as instances where objects are picked from inventory, placed into containers, containers are transported, and so forth.

In FIG. 1, a fulfillment center may be a traditional fulfillment center and may include an inventory field 110, a routing sorter 160, one or more item sorting machines 170, and one or more packing stations 180. The inventory field 110 may include a storage platform, or a portion of the fulfillment center at which products picked from product inventory are placed. Robots may be used to pick products from inventory and to deliver to the robotic storage platform in some instances, while in other instances, manual labor or a combination thereof may be used to pick products. The picking process at the robotic storage platform may include locating a product in an order, obtaining the product, and sending the product to a robotic storage platform, such as via a conveyor belt. In the illustrated embodiment, products at the robotic storage platform may be placed in a container, such as a tote.

The inventory field 110 may include multiple items that are in inventory. The items may be used to fulfill orders. The inventory field 110 may be a robotic field in some instances. One or more picking stations 130 may be positioned along a perimeter 120 of the inventory field 110. The picking stations 130 may be manually operated or may include robotic components, or a combination thereof. In some instances, picking of items from the inventory field 110 may be completed by robots that include automated robotic arms, where the items are delivered to the picking stations 130 after being retrieved from the inventory field 110. Any number of picking stations 130 may be included, and the picking stations 130 may be located in a different position than that illustrated in FIG. 1.

One or more conveyors 150 may be disposed about the inventory field 110. For example, conveyors 150 may be disposed along the perimeter 120 of the inventory field 110. The conveyors 150 may run adjacent to the picking stations 130 in some embodiments. Any suitable conveyor configuration may be used. In the illustrated example, the conveyors 150 may include belts or rollers that run alongside the picking stations 130 and include one or more paths to one or more routing sorters.

The conveyors 150 may be used to transport one or more containers, such as totes 140. For example, as totes 140 move along the conveyors 150, items may be moved from the picking stations 130 into respective totes 140. The totes 140 may be associated with particular item sorting machines, and may be moved using the conveyors 150 to a routing sorter 160. In some embodiments, some or all of the conveyors 150 may be at least partially replaced by one or more tracks for shuttles that may be used to guide shuttles from one location to another. Embodiments of the disclosure may be used to transport shuttles across different elevations at any of the various systems of the fulfillment center.

The routing sorter 160 may be configured to route, divert, or otherwise guide certain totes to an item sorting machine. The routing sorter 160 may include any combination of ramps, slides, rollers, arms, guides, and/or other components to route totes to a particular item sorting machine. At the routing sorter 160, totes including products that have been picked may be routed to the appropriate or designated item sorting machine. For example, the routing sorter 160 may determine an identifier associated with the tote, and may determine an item sorting machine associated with the tote using the identifier. The routing sorter 160 may route or direct the tote to the appropriate item sorting machine.

A number of item sorting machines 170 may be coupled to the routing sorter 160. For example, a first item sorting machine 172, a second item sorting machine 174, a third item sorting machine 176, and so forth may be coupled to the routing sorter 160. The routing sorter 160 may optionally guide totes to the item sorting machines to which they are assigned. For example, a first tote 162 may include item 1, item 16, and item 23, and may be assigned to the first item sorting machine 172. The routing sorter 160 may therefore route the first tote 162 to the first item sorting machine 172 for sortation of the respective items. A second tote 164 may include item 1656, and may be assigned to the second item sorting machine 174. The routing sorter 160 may therefore route the second tote 164 to the second item sorting machine 174 for sortation of the item. A third tote 166 may include item 989, item 145, and item 34, and may be assigned to the third item sorting machine 176. The routing sorter 160 may therefore route the third tote 166 to the third item sorting machine 176 for sortation of the respective items.

Some or all of the item sorting machines may be associated with one or more packing stations 180 that may be used to pack items into a shipment when a multi-item order is complete. For example, the first item sorting machine 172 may be coupled to a first packing station 182, the second item sorting machine 174 may be coupled to a second packing station 184, the third item sorting machine 176 may be coupled to a third packing station 186, and so forth. The item sorting machines may be configured to receive items from totes that have one or more, or multiple, items. The number of totes and/or the number of items associated with respective item sorting machines may be balanced, and multiple totes may be routed to the first item sorting machine 172 and the second item sorting machine 174 at the same time.

Embodiments of the disclosure include systems and methods for elevators for material handling shuttles. Certain embodiments may improve processing speed and/or throughput of fulfillment centers. Certain embodiments may improve performance of mechanical equipment for sortation and/or consolidation of items. While described in the context of online orders, aspects of this disclosure are more broadly applicable to other forms of object handling.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
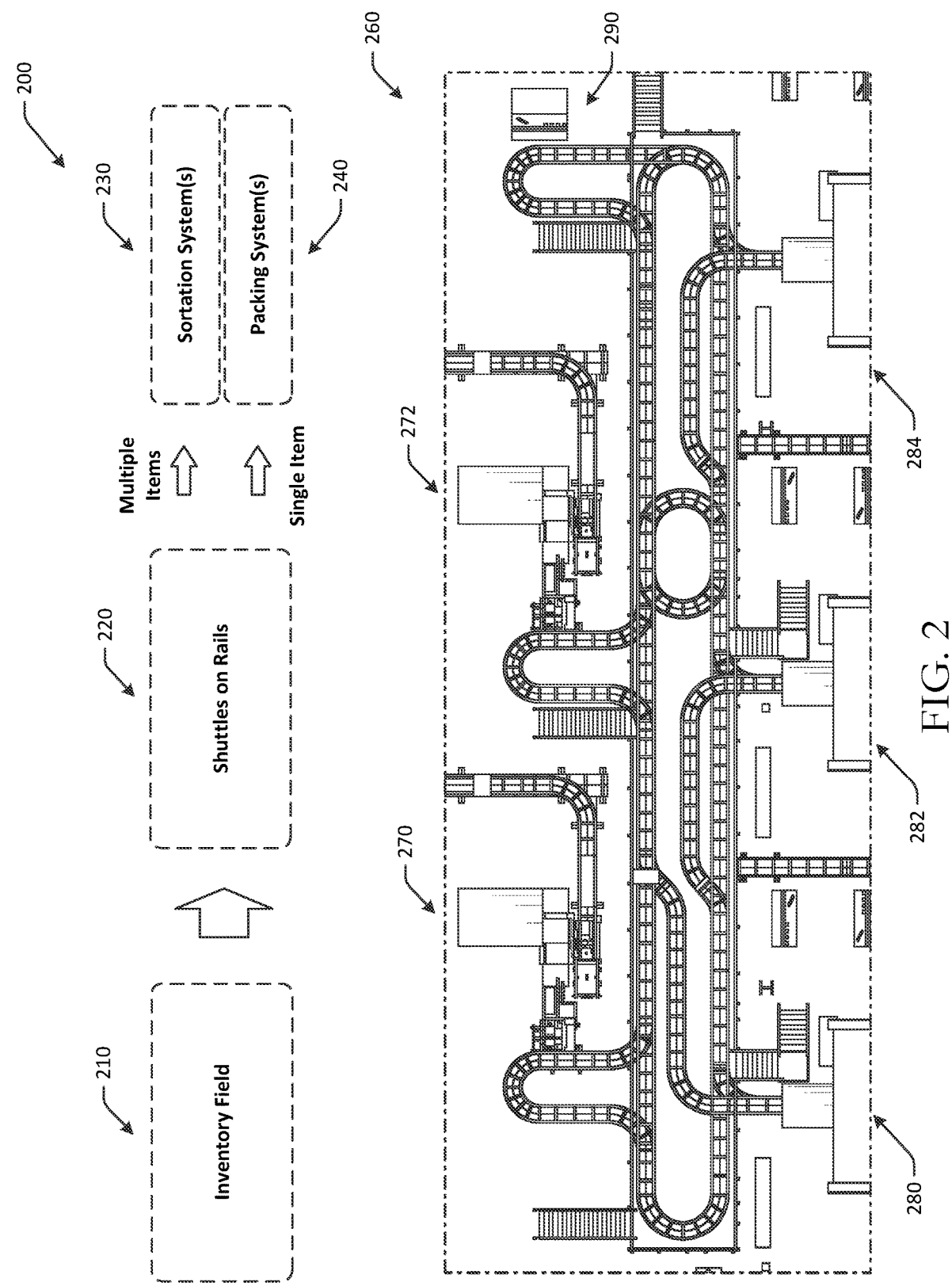
FIG. 2 is a schematic illustration of an example use case and facility layout for elevators for material handling shuttles in accordance with one or more embodiments of the disclosure.

FIG. 2 is a schematic illustration of an example use case 200 and facility layout for elevators for material handling shuttles in accordance with one or more embodiments of the disclosure. Other embodiments may include additional or fewer components. The illustration of FIG. 2 may not be to scale, and may not be illustrated to scale with respect to other figures.

In FIG. 2, a fulfillment center may include an inventory field 210, at which products or other items may be stored in inventory. As the items are ordered in online orders, the products may be picked from the inventory field 210 and routed for downstream processing in the fulfillment center. The items may be picked manually, using automated systems, or a combination thereof.

The picked products may be placed into one or more containers and the containers may be transported using one or more shuttles, such as one or more shuttles on rails 220, where the rails 220 form a track along which shuttles may move. The shuttles on rails 220 may include shuttles that are configured to transport items and/or containers from one location to another via rails. Some rails may be disposed at different elevations, and elevators for container shuttles as described herein may be used to transport the shuttles from one elevation to another. The shuttles on rails 220 may be used to transport containers from the inventory field 210 to one or more downstream processes, such as a sortation system 230, a packing system 240, etc. For example, the sortation system 230 may be a system at which items picked from the inventory field 210 may be re-sorted into respective totes or other containers for particular orders. For example, items for different orders may be placed into containers that are transported by the shuttles on rails 220 from the inventory field 210. The containers may be sent to the sortation system 230 for sorting into particular orders. The packing system 240 may be a station at which one or more items associated with an order may be packed into a box or other container for shipment. A shipping label may be applied and the package may be dispatched to a loading dock or elsewhere for shipment. Other destinations or downstream processes in addition to, or instead of, the sortation systems and packing systems may be used.

A rail system 260 is depicted in schematic view in FIG. 2. The rail system 260 is an example of a track that is used to interconnect a number of systems to each other. For example, the track may couple one or more induction stations to one or more sortation systems. The tracks may be used by shuttles to transport containers from one location to another. The track may include locations at which a shuttle can be directed to a straight path or to a loop, turn, oval, circle, and/or other geometries that involve a change in direction of a shuttle on the rails. The rail system 260 may include rails that link various systems, such as sortation systems, to each other and/or to other systems, such as container handling systems, manual induction systems, and so forth. For example, the rail system 260 may link a first sortation system 270 to a second sortation system 272, as well as to a first container handling system 280, a second container handling system 282, a third container handling system 284, and so forth. The rail system 260 may be used to connect any of the systems to each other and/or other systems.

Shuttles may move along the rails of the rail system 260. The shuttles may include linear drive motors or other drive components. Some drive components may provide a drive force via electromagnetism. As a result, one or more electromagnets may be disposed along the network of rails. Shuttles may optionally include a conveyor belt that may have a first set of one or more raised flaps and a second set of one or more raised flaps. The first set of raised flaps may form a first barrier along a first open-ended side of the shuttle, and the second set of raised flaps may form a second barrier along a second open-ended side of the shuttle to prevent items rolling off the conveyor belt. The shuttles may include an on-board drive motor configured to move the conveyor belt in a forward direction and/or a reverse direction. The shuttles may include a magnet disposed on a lower surface of the shuttle. The magnet may be used to propel and/or secure the shuttle. For instance, certain shuttles may include one or more magnets, such as permanent magnets, underneath the shuttle that interact with electromagnets disposed along a set of rails. The permanent magnet and electromagnets may work together to form a linear induction motor that propels the shuttle. In some instances, the magnet may prevent the shuttle from moving while the vehicle is in motion and the linear drive motor is engaged. To onboard or offload containers, the linear drive motor of the shuttle or other component may be used in conjunction with the magnet to impart motion.

Figure 3:
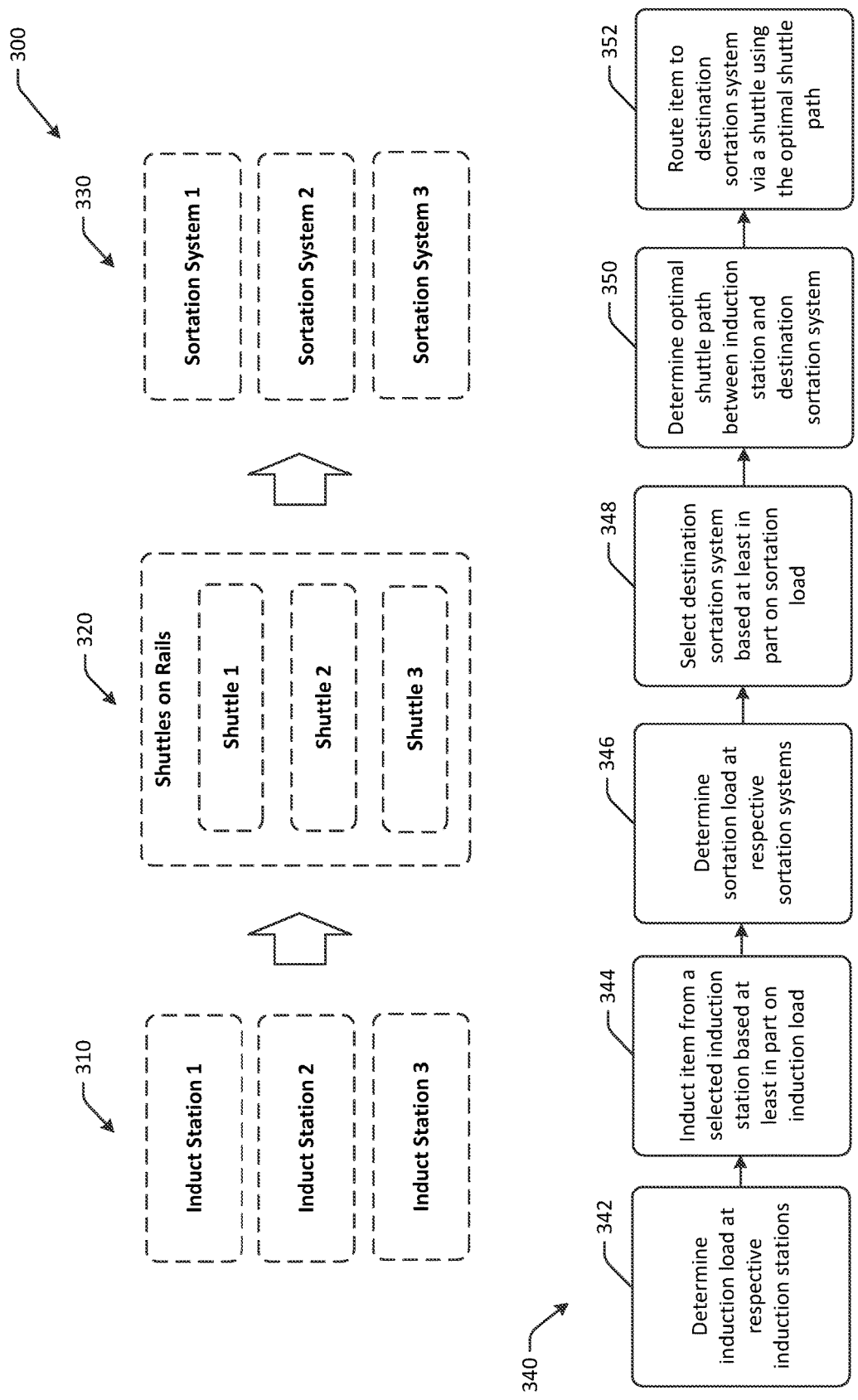
FIG. 3 is a schematic illustration of an interconnected sortation system with multiple inputs and multiple destinations, along with an example process flow, in accordance with one or more embodiments of the disclosure.

FIG. 3 is a schematic illustration of an interconnected sortation system with multiple inputs and multiple destinations, along with an example process flow, in accordance with one or more embodiments of the disclosure. Other embodiments may include additional or fewer components. The illustration of FIG. 3 is not to scale, and may not be illustrated to scale with respect to other figures. The system illustrated in FIG. 3 may include the same elevators for material handling shuttles discussed with respect to FIGS. 1-2, and/or may be used with any of the systems described herein.

An interconnected system 300 may include one or more induction stations 310, such as a first induction station, a second induction station, a third induction station, and so forth. Any number of induction stations may be included. At the respective induction stations, items may be inducted into the interconnected system 300 for sortation and/or other downstream processes.

The interconnected system 300 may include one or more shuttles on rails 320. The shuttles on rails 320 may include one or more shuttles, such as a first shuttle, a second shuttle, and a third shuttle, etc. that move along rails that form a track, where the track(s) may be disposed at different elevations or levels. Any number of shuttles may be used. The track may connect the induction stations 310 to one or more sortation systems 330. The track may enable shuttles to transport items from any one of the induction stations 310 to any one of the sortation systems 330. The rails 320 may be a track that is configured to provide continuous rail for movement of shuttles in an electromagnetically propelled shuttle-on-rail arrangement. Shuttle-on-rail arrangements may be used in many systems, such as sortation systems, pick systems, delivery systems, etc. The shuttles on rails 320 may include rail switch mechanisms to allow the rail to be directed to alternate path. Shuttle-rail arrangements that are based on electromagnetic propulsion, such as linear drive motors, may have sets of electromagnets arranged along the direction of the rails. Shuttles may also have a magnet, such as a permanent magnet, coupled to a lower side of the shuttle. The electromagnet and the permanent magnet may have to be separated by a very narrow gap for optimal performance.

The interconnected system 300 may include one or more sortation systems 330, such as a first sortation system, a second sortation system, a third sortation system, and so forth. Any number of sortation systems may be included. Items may be unloaded from the shuttles at a destination sortation system 330 for sortation and/or for aggregation. For example, all of the items associated with a multiple-item order may be aggregated in a particular container at a sortation system. Once the container is full and/or the items in an order have been aggregated, the container in which the items are disposed may be removed from the sortation system and transported downstream using the shuttles for packing, etc.

To move along the track, the shuttles may include respective permanent magnets, and the interconnected system 300 may include a plurality of linear motors disposed along the track. The respective permanent magnets interact with the plurality of linear motors to propel the shuttles along the track. The track can include one or more paths, such as a plurality of paths, between the first induction station and the first sortation system.

The interconnected system 300 may include a computer system and/or another controller configured to route items from the induction stations 310 to the sortation systems 330 using the shuttles.

To manage shuttle movement and sortation load for optimal balance and maximum throughput, the controller may execute one or more process flows, such as one or more operations in example process flow 340. At block 342, the controller may determine an induction load at the respective induction stations 310. For example, the controller may determine a number of items waiting to be inducted at the different induction stations 310. The induction load may be the number of items queued for induction or en route to a particular induction station for induction into the interconnected system 300.

At block 344, the controller may induct an item from a selected induction station based at least in part on induction load. For example, the controller may determine an induction station with the highest induction load, and may route shuttles to that induction station to induct items, so as to reduce the likelihood of a backup or jam (e.g., bottleneck, etc.) due to overload at an induction station. In one example, the controller may determine that a first induction load at the first induction station is greater than a second induction load at the second induction station. The controller may therefore cause a first shuttle of the plurality of shuttles to be routed to the first induction station to retrieve a first item, and may cause a second shuttle of the plurality of shuttles to be routed to the first induction station to retrieve a second item.

At block 346, the controller may determine a sortation load at the respective sortation systems. For example, the controller may determine a sortation system with the lowest sortation load, and may route shuttles to that sortation system to sort items, so as to reduce the likelihood of a backup or jam (e.g., bottleneck, etc.) due to overload at a sortation system. In some instances, items that are part of a multi-item order may be destined for the same sortation system as the other items in the same order (e.g., subsequent items follow the initial item in an order, etc.).

At block 348, the controller may select a destination sortation system based at least in part on the sortation load. For example, the controller may route shuttles to sortation systems with relatively lower sortation loads, so as to maintain sortation balance across all of the sortation systems and to increase throughput. For example, the controller may be configured to determine that a first sortation load at the first sortation system is greater than a second sortation load at the second sortation system, and the controller may therefore determine that an item at the first induction section is to be routed to the second sortation system based at least in part on the second sortation load. In another example, the controller may determine that a first sortation load at the first sortation system is greater than a second sortation load at the second sortation system. The controller may therefore cause a first shuttle of the plurality of shuttles to be routed to the second sortation system to unload an item for sortation. Sortation system selection may also be determined based at least in part on a distance between the sortation system and a particular induction station, a time to travel the distance, a number of active shuttles, and/or other factors.

At block 350, the controller may determine an optimal shuttle path between an induction station and the selected destination sortation system. The optimal path may be the shortest path, the quickest path, the path with the least obstacles, and/or a combination thereof. For example, the controller may determine traffic patterns of other active shuttles, shuttle merging times, and/or other factors to determine an optimal path. The controller may determine a first optimal path along the track for a first shuttle, and may then determine a second optimal path along the track for a second shuttle based at least in part on the first optimal path (e.g., paths of other shuttles may be considered when determining optimal paths for a particular shuttle, etc.). In some embodiments, the controller may determine a first shuttle launch time for a first shuttle of the plurality of shuttles, and may determine a second shuttle launch time for a second shuttle of the plurality of shuttles based at least in part on the first shuttle launch time and a shuttle position of a third shuttle of the plurality of shuttles. The shuttle launch times may be part of the optimal path determination, as shuttle launch times may affect the time it takes for a shuttle to travel between an induction station and a destination sortation system.

At block 352, the controller may route the item to the destination sortation system via a shuttle using the optimal shuttle path. The shuttle may be deployed and may deliver the item to the sortation system. The shuttle may then return to an induction station to retrieve another item. In this manner, induction loads and sortation loads can be managed across an entire system, bottlenecks can be reduced, and throughput can be increased.

Figure 4A:
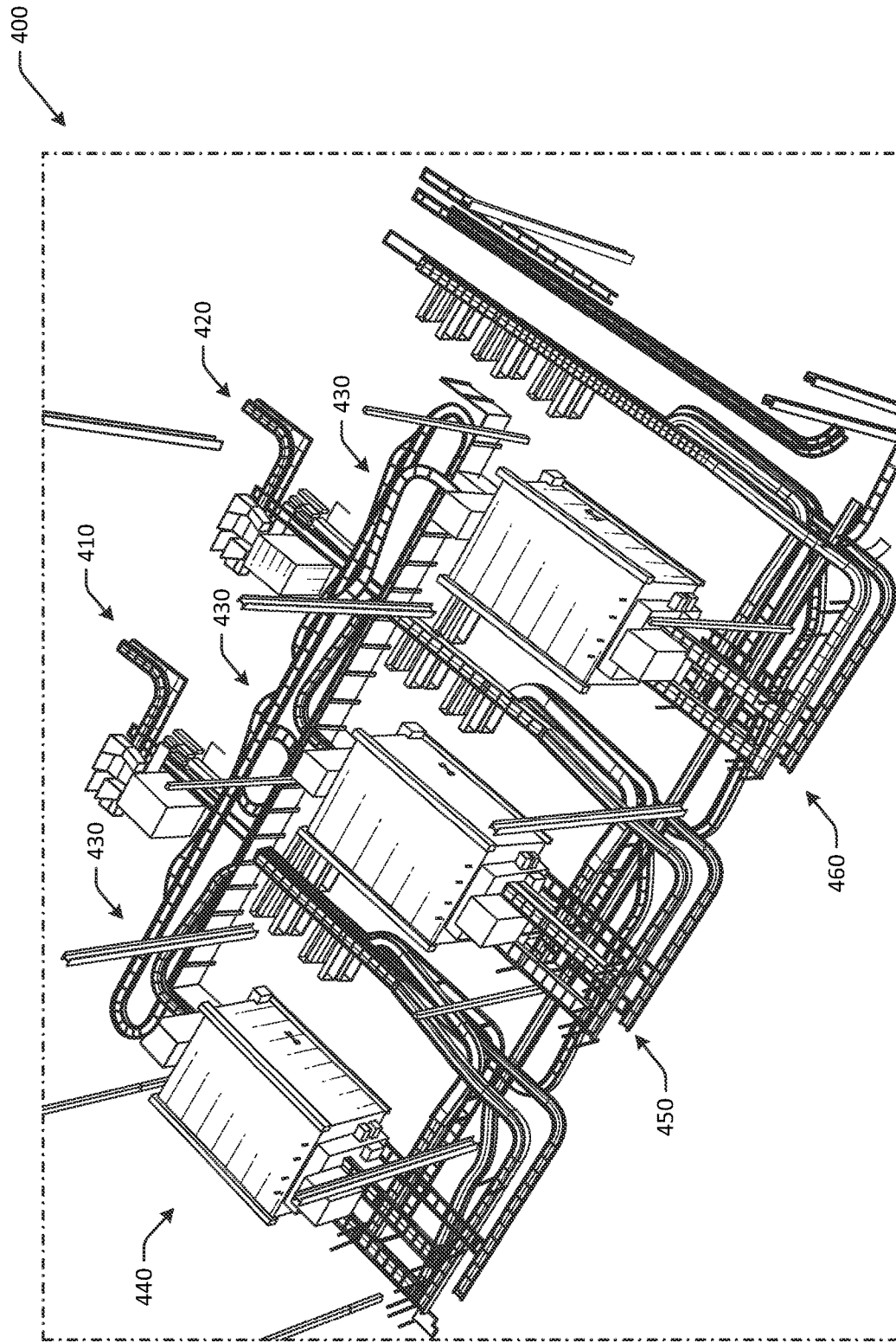
FIGS. 4A-4B are schematic illustrations of an interconnected sortation system with multiple inputs and multiple destinations in accordance with one or more example embodiments of the disclosure.
Figure 4B:
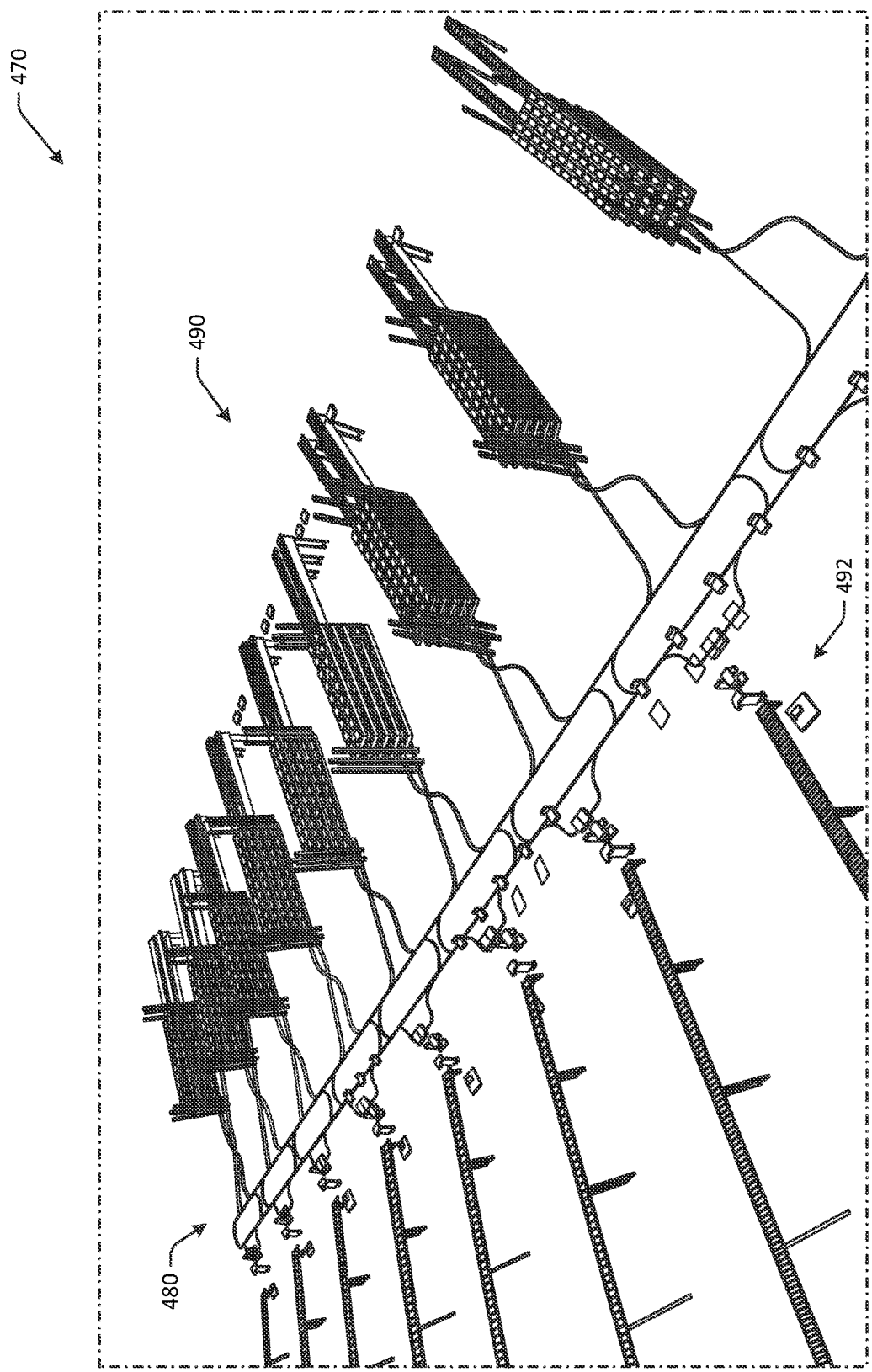

FIGS. 4A-4B are schematic illustrations of an interconnected sortation system with multiple inputs and multiple destinations in accordance with one or more example embodiments of the disclosure. Other embodiments may include additional or fewer components. The illustrations of FIGS. 4A-4B are not to scale, and may not be illustrated to scale with respect to other figures. The systems illustrated in FIGS. 4A-4B may include the same elevator systems discussed with respect to FIGS. 1-3.

In FIG. 4A, the interconnected sortation system 400 may allow for multiple machines to be connected together. The interconnected sortation system 400 may include a track 430 that connects multiple machines together, where the track 430 may include multiple merging sections and/or diverging sections. For example, the track 430 may connect a first induction station 410 to a second induction station 420. Any number of induction stations may be included. The track 430 may connect one or both the first induction station 410 and the second induction station 420 to one or more, or all, of a first sortation system 440, a second sortation system 450, and/or a third sortation system 460. Any number of sortation systems may be included. The track 430 may include one or more paths between the first induction station 410 and any individual one of the sortation systems. In some embodiments, the track 430 may form more than one route to a specific sortation system from a particular induction station.

The interconnected sortation system 400 may therefore include the first sortation system 440 and the second sortation system 450. The interconnected sortation system 400 may include the first induction station 410 at which first items can be inducted. The interconnected sortation system 400 may include the second induction station 420 at which second items can be inducted. The interconnected sortation system 400 may include the track 430 that may be configured to connect the first sortation system 440 to both the first induction station 410 and the second induction station 420, and to connect the second sortation system 450 to both the first induction station 410 and the second induction station 420. The interconnected sortation system 400 may include one or more, such as a plurality, of shuttles configured to move along the track 430. The track 430 may be optionally configured to connect the first sortation system 440 to the second sortation system 450, and to connect the first induction station 410 to the second induction station 420.

The interconnected sortation system 400 may therefore provide the ability to automate induct and sortation processes that uses a shuttle merge and sorter that connects sortation systems with item induction lanes. The interconnected sortation system 400 may therefore consolidate the discrete sortation processes, thereby removing the need for separate pick paths, and also providing a compact footprint and increased throughput due to interconnected systems that allow for load balancing.

In FIG. 4B, a portion of a fulfillment center 470 may include a number of induction stations 492 that are coupled to a number of sortation systems 490 via a track 480. Shuttles may move along the track 480 to transport items from the induction stations 492 to the sortation systems 490. Items may flow to the induction stations 492 from inventory processes upstream. Items may be transported from the induction stations 492 via shuttles that move along the track 480 to the various sortation systems 490.

When a shipment opener is first inducted (e.g., the first item of an order that has multiple items, etc.), a controller in communication with the system may execute a chute assignment algorithm to determine which chute and/or which sortation system the order is to be assigned to. For all subsequent items in the order, the items may be routed to the same chute, such that all items are aggregated in the same container. After dropping an item off, when an empty shuttle is about to reenter the track, the controller may perform one or more calculations to determine which induction station the shuttle is to return to in order to retrieve another item.

In one embodiment, items can be picked to totes, and the totes or individual items can be loaded onto shuttles. Individual shuttles may merge on to a shuttle highway (e.g., the track, etc.). The track may include multiple merges and diverts for different induction stations and sortation systems. The controller of the system may determine optimal paths and manage shuttle traffic. Once the shuttle reaches the destination sortation system, a lift or container elevator as described herein may move the shuttle vertically to the destination level. The shuttle can then traverse through a central spine of the sortation system to a destination container and can drop the item using an onboard conveyor. Full containers may be removed from the sortation system using a shuttle and sent downstream for packing. Empty containers can be used to replace removed full containers.

Figure 5:
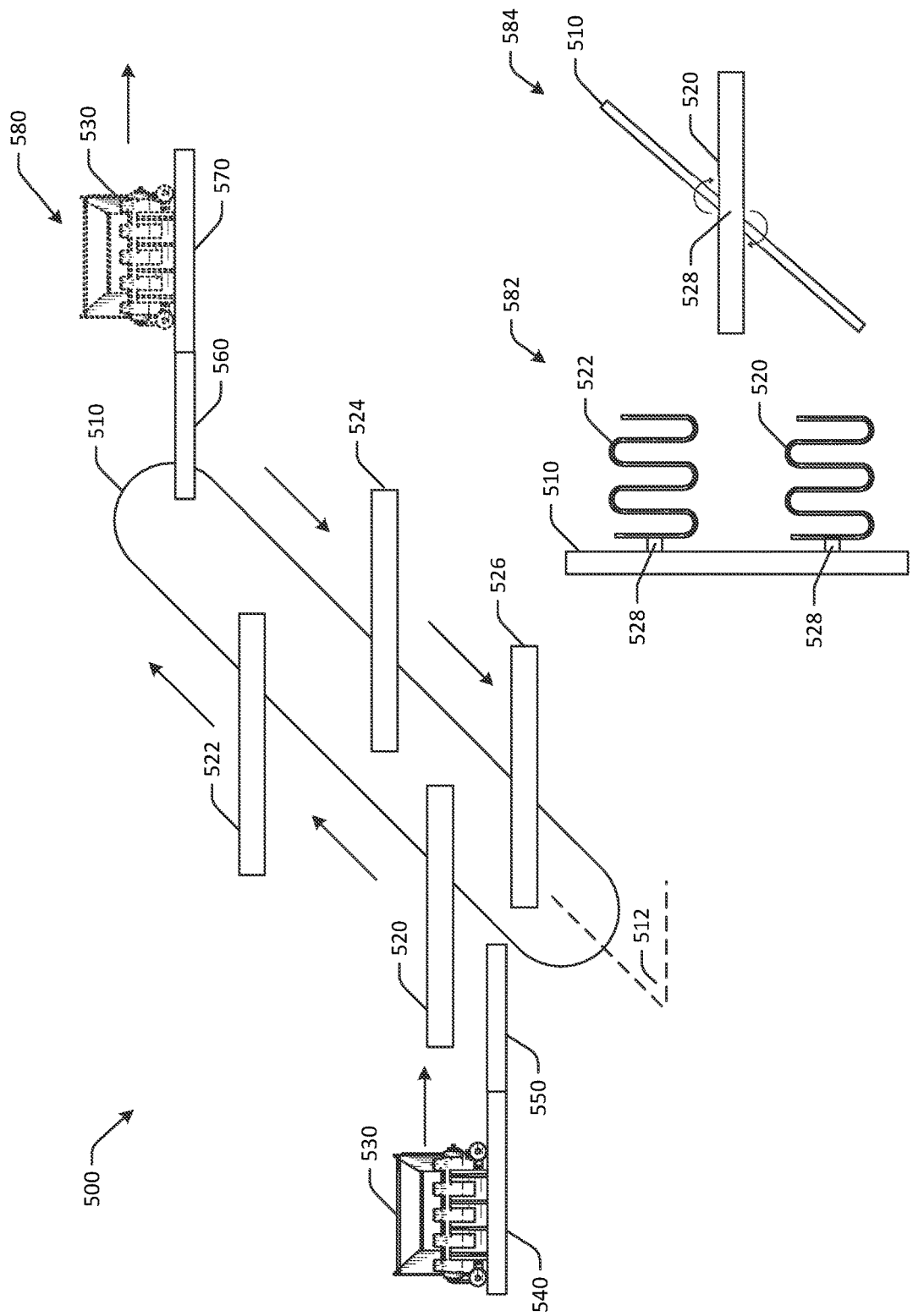
FIG. 5 is a schematic illustration of various views of an angled elevator for material handling shuttles in accordance with one or more embodiments of the disclosure.

FIG. 5 is a schematic illustration of various views of an angled elevator 500 for material handling shuttles in accordance with one or more embodiments of the disclosure. Other embodiments may include additional or fewer components. The illustration of FIG. 5 is not to scale, and may not be illustrated to scale with respect to other figures. The elevator system illustrated in FIG. 5 may be used with the systems discussed with respect to FIGS. 1-4.

In FIG. 5, the angled elevator 500 may be configured to transport container shuttles from a first elevation to a second elevation. The angled elevator 500 may be configured to transport container shuttles to higher elevations or levels and/or lower elevations or levels. The angled elevator 500 may be in continuous motion, and may be configured to operate at a constant speed. In other embodiments, the angled elevator 500 may be configured to move in a reciprocating motion and/or at variable speed.

The angled elevator 500 may include a track 510. The track 510 may be oval or rectangular in geometry. Other embodiments may have different loop-based geometries, such as circular, square, etc. The angled elevator 500 may include one or more platforms coupled to the track 510. For example, the angled elevator 500 may include a first platform 520, a second platform 522, a third platform 524, a fourth platform 526, and so forth. Any number of platforms may be included. The platforms may have the same or different geometries and/or configuration.

The platforms may be configured to rotate with respect to the track 510, so as to allow for shuttles loaded onto a platform to maintain a substantially horizontal orientation during transport. For example, as depicted in top view 582, the first platform 520 and the second platform 522 may be coupled to the track 510 via respective coupling mechanisms 528. The coupling mechanism 528 may be configured to allow the platform to rotate with respect to the coupling mechanism 520, as depicted in front view 584.

The angled elevator 500 may have an angled orientation 512 as determined by a central axis of the track 510. In the illustrated embodiment, the angled elevator 500 may have a 45 degree orientation. In other embodiments, the angled elevator 500 may have an angled orientation of about 30 degrees to about 60 degrees. In yet other embodiments, the angled elevator 500 may have a vertical orientation, such as that depicted in FIG. 7, but such embodiments may consume more space in a facility.

To change elevation of a shuttle, a shuttle 530 may move along a first set of rails 540 to a loading zone 550. The shuttle 530 may be propelled onto the loading zone 550 via one or more electromagnets. The loading zone 550 is discussed in detail with respect to FIG. 6. As the shuttle 530 is on the loading zone 550, a platform, such as the first platform 520, may move along the track 510 and may pass through the loading zone 550 (in the direction illustrated by arrows in FIG. 5) and engage a lower surface of the shuttle 530.

As the first platform 520 moves along the track 510, the shuttle 530 may remain level or in a horizontal orientation due to the rotation of the platform with respect to the track 510 via the coupling mechanism 528.

As the first platform 520 moves along the track 510 with the shuttle 530 onboard, the first platform 520 may pass through an unloading zone 560, where the unloading zone 560 contacts the lower surface of the shuttle 530, and supports the shuttle 530 as the first platform 520, now unloaded, keeps moving along the track 510. The shuttle 530 may therefore be passively transferred from the first platform 520 to the unloading zone 560.

One or more electromagnets may be disposed along the unloading zone 560, and may propel the shuttle 530 from the unloading zone 560 to a second set of rails 570 disposed adjacent to the unloading zone 560. The shuttle 530 may therefore be at a relatively higher elevation 580 due to the angled elevator 500, and may continue moving along the second set of rails 570 at the higher elevation.

The platforms may maintain alignment of the shuttle 530 during transport, such that the shuttle 530 can engage the second set of rails 570 without repositioning. As the shuttle 530 may be inoperable due to misalignment, the angled elevator 500 may be configured to maintain positioning of the shuttle 530 during transport due to the configuration of the platforms, and the configuration of the loading zone 560 and unloading zone 570.

The angled elevator 500 may therefore be a system configured to change elevation of a shuttle. The angled elevator 500 may include an elevator track, such as the track 510, disposed between the loading zone 550 and the unloading zone 560, where the elevator track may be an angled track, or a non-vertical elevator track. The elevator track may have a central axis oriented at between 30 degrees and 60 degrees. In some embodiments, the elevator track may be in continuous motion during loading of the shuttle onto the platform and unloading of the shuttle off the platform. The angled elevator 500 may include a platform coupled to the elevator track and configured to move between the loading zone and the unloading zone, where the platform may be configured to engage with a lower surface of the shuttle at the loading zone. The platform may be configured to lift the shuttle off a first set of rails at the loading zone, and to position the shuttle onto a second set of rails at the unloading zone. Some embodiments may include a coupling device that couples the platform to the elevator track, where the coupling device is configured to allow the platform to rotate with respect to the elevator track. As depicted in the top view 582, the platform may be coupled to the elevator track along a side surface of the platform.

In one embodiment, items can be picked to totes, and the totes or individual items can be loaded onto shuttles. Individual shuttles may merge on to a shuttle highway (e.g., the track, etc.). The track may include multiple merges and diverts for different induction stations and sortation systems. The controller of the system may determine optimal paths and manage shuttle traffic. Once the shuttle reaches the destination sortation system, the angled elevator 500 may move the shuttle vertically to the destination level. The shuttle can then traverse through a central spine of the sortation system to a destination container and can drop the item using an onboard conveyor. Full containers may be removed from the sortation system using a shuttle and sent downstream for packing. Empty containers can be used to replace removed full containers.

Figure 6:
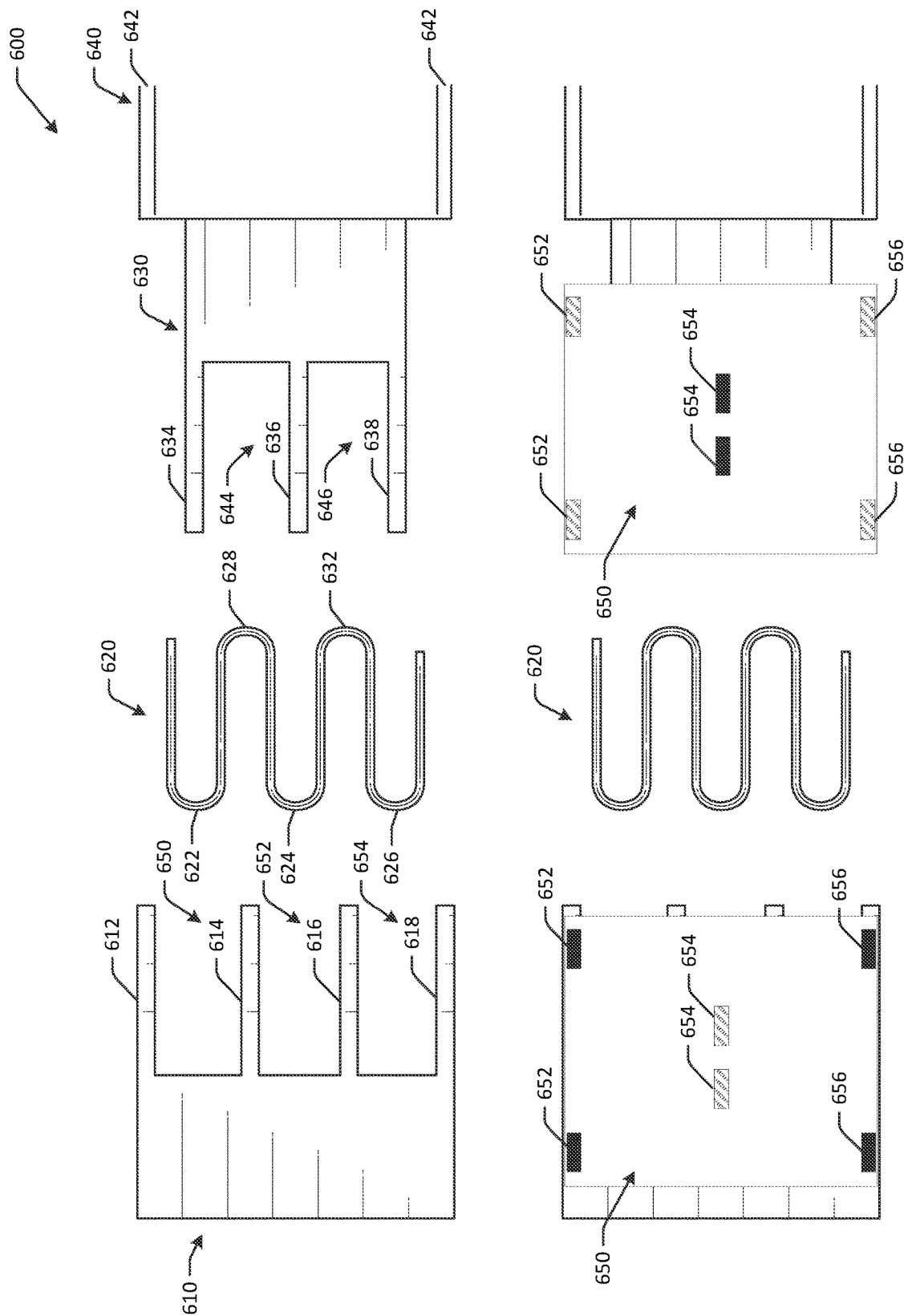
FIG. 6 is a schematic illustration of a loading and unloading zone for elevators for material handling shuttles in various views in accordance with one or more embodiments of the disclosure.

FIG. 6 is a schematic illustration of a loading and unloading zone for elevators for material handling shuttles 600 in various views in accordance with one or more embodiments of the disclosure. Other embodiments may include additional or fewer components. The illustration of FIG. 6 is not to scale, and may not be illustrated to scale with respect to other figures. The system components illustrated in FIG. 6 may be the same system components discussed with respect to FIGS. 1-5.

In FIG. 6, the elevator for material handling shuttles 600 may include a loading zone 610 at which shuttles can be loaded onto a platform 620. The platform 620 may be configured to passively interface with the loading zone 610 by passing through the loading zone 610. For example, the loading zone 610 may include a set of rails that may be disposed on elongated members of the loading zone 610. In the depicted embodiment, the loading zone 610 may include a first elongated member 612, a second elongated member 614, a third elongated member 616, and a fourth elongated member 618. The set of rails may be disposed on the first elongated member 612 and the fourth elongated member 618. As depicted on the lower half of FIG. 6, a shuttle 650 may include a first set of wheels 652 that may engage one of the rails of the loading zone 610, and the shuttle 650 may include a second set of wheels 656 that may engage the other of the rails of the loading zone 610.

The loading zone 610 may include at least one gap between the first set of rails, and the platform 620 may be configured to pass through the at least one gap. In the depicted embodiment, the loading zone 610 may include three gaps between the first set of rails, and the platform 620 may include a first rounded portion 622 that passes through a first gap 650 of the loading zone 610, a second rounded portion 624 that passes through a second gap 652 of the loading zone 610, and a third rounded portion 626 that passes through a third gap 654 of the loading zone 610. The gaps may be formed between the respective elongated members of the loading zone 610. The platform 620 may have a rectangular member arranged in a wave-like geometry, as depicted in FIG. 6. Other embodiments may have different geometries.

The shuttle 650 may be propelled onto the loading zone 610 via interaction between a permanent magnet coupled to the shuttle 650 and a first linear motor disposed adjacent to the loading zone 610. For example, the permanent magnet may interact with the first linear motor to propel the shuttle onto the loading zone 610.

The elevator for material handling shuttles 600 may include an unloading zone 630 at which shuttles can be unloaded from the platform 620. As the shuttle 650 is transported to the unloading zone 630 via the platform 620, the shuttle 650 may be lowered onto the unloading zone 630. The platform 620 may be configured to passively interface with the unloading zone 630 by passing through the unloading zone 630. For example, the unloading zone 630 may include a set of rails that may be disposed adjacent to the unloading zone 630. In the depicted embodiment, the unloading zone 630 may include a first elongated member 634, a second elongated member 636, and a third elongated member 638.

The unloading zone 630 may include at least one gap between the elongated members, and the platform 620 may be configured to pass through the at least one gap. In the depicted embodiment, the unloading zone 630 may include two gaps, and the platform 620 may include a fourth rounded portion 628 that passes through a first gap 644 of the unloading zone 630, and a fifth rounded portion 632 that passes through a second gap 646 of the unloading zone 630. The gaps may be formed between the respective elongated members of the unloading zone 630.

The platform 620 may therefore have a configuration that facilitates movement through both the loading zone 610 and the unloading zone 630 without active repositioning of the shuttle 650. As the shuttle 650 is transferred from the platform 620 to the unloading zone 630, the shuttle 650 may be propelled onto a second set of rails 642 disposed adjacent to the unloading zone 630 via one or more electromagnets. The shuttle 650 may continue down a track 640 formed by the second set of rails 642 at a different elevation than the loading zone 610. In some embodiments, the loading zone 610 may be disposed at a first level of a sortation system, and the unloading zone 630 may be disposed at a second level of the sortation system. As depicted in FIG. 6, in some embodiments, a first configuration of the loading zone 610 may be different than a second configuration of the unloading zone 630.

As depicted on the lower half of FIG. 6, the shuttle 650 may include the first set of wheels 652 that may engage one of the rails of the loading zone 610, and the shuttle 650 may include the second set of wheels 656 that may engage the other of the rails of the loading zone 610. The shuttle 650 may optionally include a third set of wheels 654 that may be disengaged from the loading zone 610, but may be used to align the shuttle 650 at the unloading zone 630. Accordingly, the second elongated member 636 of the unloading zone 630 may optionally include a rail that is configured to engage the third set of one or more wheels 654 of the shuttle 650, so as to ensure proper alignment of the first set of wheels 652 and the second set of wheels 656 with the set of rails 642 when propelled downstream off the unloading zone 630 and onto the track 640. In other embodiments, the platform 620 may include a wheel engagement portion that is configured to engage one or more wheels (e.g., the third set of wheels 654, etc.), or an area adjacent to the one or more wheels, disposed on the lower surface of the shuttle 650. The shuttle 650 may be unloaded such that the third set of wheels is positively positioned at the unloading zone 630. The solid shading of the wheels of the shuttle in FIG. 6 indicate the wheels engaged with a rail, whereas the pattern shading of the wheels indicates wheels disengaged from a rail. Accordingly, in some embodiments, the first set of wheels 652 and the second set of wheels 656 may be disengaged from rails at the unloading zone 630.

Figure 7:
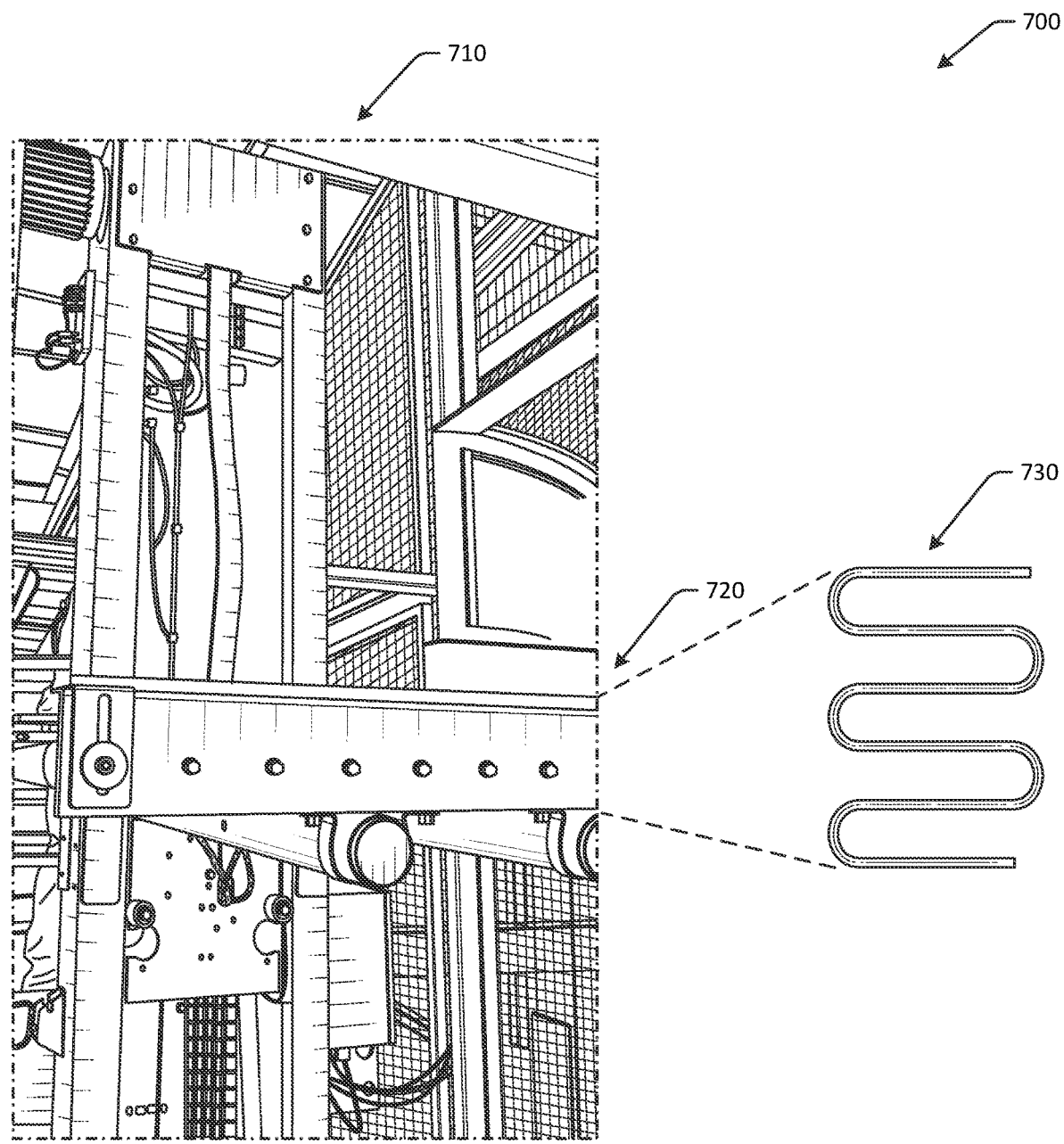
FIG. 7 is a schematic illustration of a vertical elevator for material handling shuttles in accordance with one or more embodiments of the disclosure.

FIG. 7 is a schematic illustration of a vertical elevator 700 for material handling shuttles in accordance with one or more embodiments of the disclosure. Other embodiments may include additional or fewer components. The illustration of FIG. 7 is not to scale, and may not be illustrated to scale with respect to other figures. The elevator system illustrated in FIG. 7 may be used with the systems discussed with respect to FIGS. 1-6.

In FIG. 7, the vertical elevator 700 may include a track 710 that may be a reciprocating track (e.g., moves up and down, etc.), or may be a continuous motion track that moves in a loop. The vertical elevator 700 may include a platform 720 used to engage with lower surfaces of shuttles at a loading zone and/or unloading zone, as described with respect to FIG. 6. In some embodiments, the platform 720 may have a wave-like configuration 730 as depicted in top view in FIG. 7. Other embodiments may have different platform configurations.

Unlike the angled elevator embodiment discussed with respect to FIG. 5, the vertical elevator 700 may provide an elevation change solution, but may have a bigger footprint and/or consume more space in a facility. In addition, a reciprocating vertical elevator may reduce throughput and/or increase complexity of shuttle transport operations.

Some embodiments may therefore be systems for handling shuttles, where the system may include a rail-based track system having a first level and a second level, an angled or vertical elevator track disposed between a loading zone disposed at the first level and an unloading zone disposed at the second level, and a platform coupled to the angled or vertical elevator track and configured to move between the loading zone and the unloading zone. The platform may be configured to engage with a lower surface of a shuttle positioned at the loading zone. The platform may be configured to lift the shuttle off a first set of rails at the loading zone, and to position the shuttle onto a second set of rails at the unloading zone.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
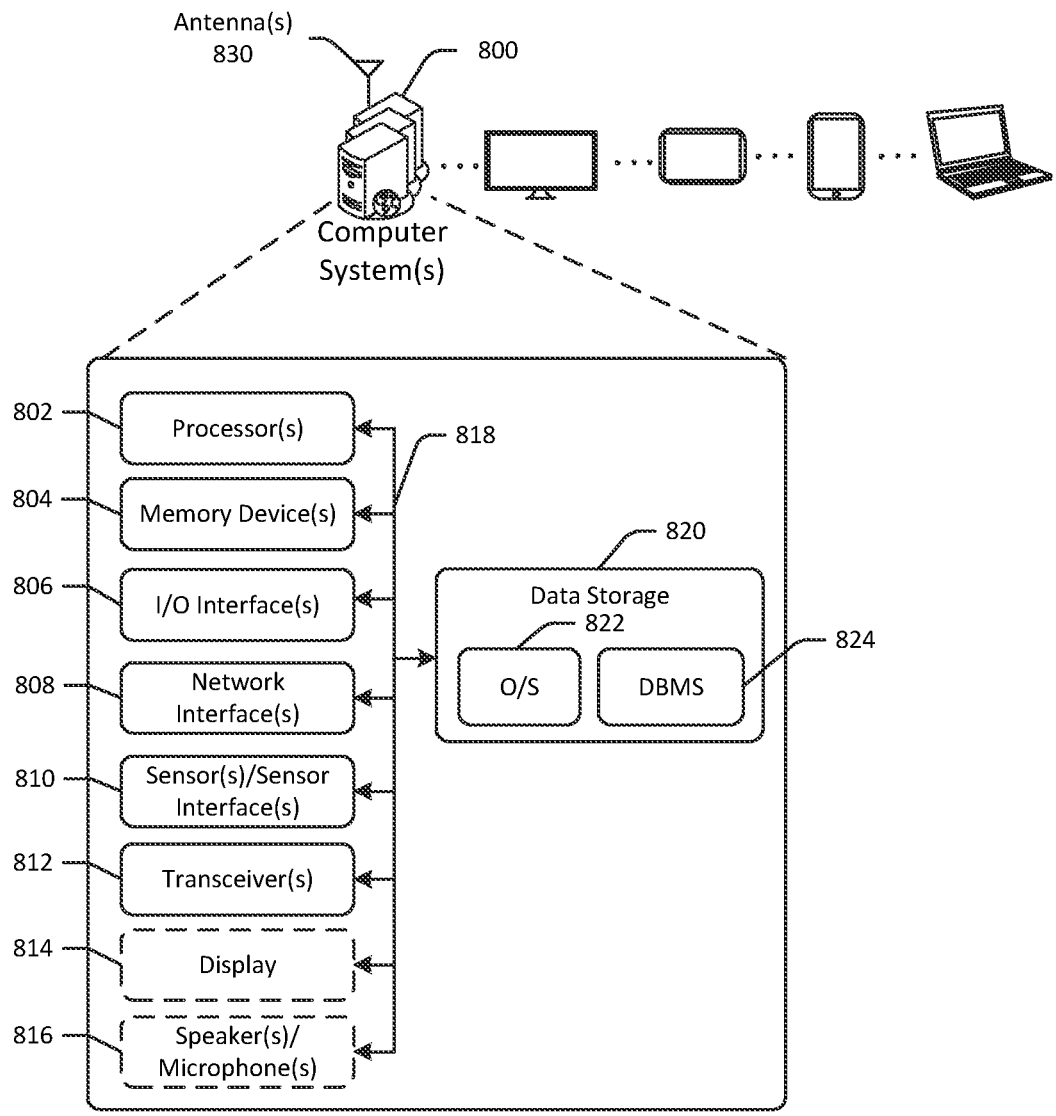
FIG. 8 schematically illustrates an example architecture of a computer system associated with a system in accordance with one or more embodiments of the disclosure.

FIG. 8 is a schematic block diagram of one or more illustrative computer system(s) 800 associated with an elevator system in accordance with one or more example embodiments of the disclosure. The computer system(s) 800 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 800 may correspond to an illustrative device configuration for the controller(s) of the elevator system discussed with reference to FIGS. 1-7. For example, the computer system(s) 800 may be a controller and may control one or more aspects of the elevator systems described in FIGS. 1-7.

The computer system(s) 800 may be configured to communicate with one or more servers, user devices, or the like. The computer system(s) 800 may be configured to identify shuttles, direct shuttles, move shuttles, control elevator operation, and so forth.

The computer system(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 800 may include one or more processors (processor(s)) 802, one or more memory devices 804 (also referred to herein as memory 804), one or more input/output (I/O) interface(s) 806, one or more network interface(s) 808, one or more sensor(s) or sensor interface(s) 810, one or more transceiver(s) 812, one or more optional display(s) 814, one or more optional microphone(s) 816, and data storage 820. The computer system(s) 800 may further include one or more bus(es) 818 that functionally couple various components of the computer system(s) 800. The computer system(s) 800 may further include one or more antenna(s) 830 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit the exchange of information (e.g., data (including computer-executable code), signaling, etc.) between various components of the computer system(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 804 of the computer system(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. Moreover, output data generated as a result of execution of the computer-executable instructions by the processor(s) 802 may be stored initially in the memory 804, and may ultimately be copied to the data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like. Some or all of these module(s) may be sub-module(s). Any of the components depicted as being stored in the data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in the data storage 820 may support functionality described in reference to corresponding components named earlier in this disclosure.

The data storage 820 may further store various types of data utilized by the components of the computer system(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 802 may be configured to access the memory 804 and execute the computer-executable instructions loaded therein. For example, the processor(s) 802 may be configured to execute the computer-executable instructions of the various program module(s), applications, engines, or the like of the computer system(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to other illustrative components depicted as being stored in the data storage 820, the O/S 822 may be loaded from the data storage 820 into the memory 804 and may provide an interface between other application software executing on the computer system(s) 800 and the hardware resources of the computer system(s) 800. More specifically, the O/S 822 may include a set of computer-executable instructions for managing the hardware resources of the computer system(s) 800 and for providing common services to other application programs (e.g., managing memory allocation among various application programs). In certain example embodiments, the O/S 822 may control execution of the other program module(s). The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 800 is a mobile device, the DBMS 824 may be any suitable lightweight DBMS optimized for performance on a mobile device.

Referring now to other illustrative components of the computer system(s) 800, the input/output (I/O) interface(s) 806 may facilitate the receipt of input information by the computer system(s) 800 from one or more I/O devices as well as the output of information from the computer system(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(s) 830 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 800 may further include one or more network interface(s) 808 via which the computer system(s) 800 may communicate with any of a variety of other systems, platforms, networks, devices, and so forth. The network interface(s) 808 may enable communication, for example, with one or more wireless routers, one or more host servers, one or more web servers, and the like via one or more networks.

The antenna(s) 830 may include any suitable type of antenna depending, for example, on the communications protocols used to transmit or receive signals via the antenna(s) 830. Non-limiting examples of suitable antenna(s) may include directional antenna(s), non-directional antenna(s), dipole antenna(s), folded dipole antenna(s), patch antenna(s), multiple-input multiple-output (MIMO) antenna(s), or the like. The antenna(s) 830 may be communicatively coupled to one or more transceivers 812 or radio components to which or from which signals may be transmitted or received.

As previously described, the antenna(s) 830 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 830 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 830 may be configured to transmit or receive radio frequency signals within any suitable frequency range forming part of the unlicensed portion of the radio spectrum.

The antenna(s) 830 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(s) 830—transmitting or receiving radio frequency (RF) signals in the bandwidth and/or channels corresponding to the communications protocols utilized by the computer system(s) 800 to communicate with other devices. The transceiver(s) 812 may include hardware, software, and/or firmware for modulating, transmitting, or receiving—potentially in cooperation with any of antenna(s) 830—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the computer system(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 814 may be configured to output light and/or render content. The optional speaker(s)/microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the computer system(s) 800 may include alternate and/or additional hardware, software, or firmware components beyond those described or depicted without departing from the scope of the disclosure. More particularly, it should be appreciated that software, firmware, or hardware components depicted as forming part of the computer system(s) 800 are merely illustrative and that some components may not be present or additional components may be provided in various embodiments. While various illustrative program module(s) have been depicted and described as software module(s) stored in the data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system comprising:
   a first sortation system comprising a first container matrix;
   a second sortation system comprising a second container matrix;

a track disposed between the first sortation system and the second sortation system, wherein the track comprises a first level and a second level;

a shuttle configured to access both the first sortation system and the second sortation system using the track, wherein the shuttle comprises a permanent magnet;

an elevator track disposed between a loading zone at the first level of the track and an unloading zone at the second level of the track; and a platform coupled to the elevator track and configured to move between the loading zone and the unloading zone, the platform configured to engage with a lower surface of the shuttle at the loading zone;

wherein the platform is configured to lift the shuttle off a first set of rails of the track at the loading zone, and to position the shuttle onto a second set of rails of the track at the unloading zone.

2. The system of claim 1, wherein the elevator track is a non-vertical elevator track having a central axis oriented at between 30 degrees and 60 degrees; and wherein the elevator track is in continuous motion during loading of the shuttle onto the platform and unloading of the shuttle off of the platform.

3. The system of claim 1, further comprising:

a coupling device that couples the platform to the elevator track, wherein the coupling device is configured to allow the platform to rotate with respect to the elevator track;

wherein the platform comprises a rectangular member arranged in a wave-like geometry, and the platform is coupled to the elevator track along a side surface of the platform.

4. The system of claim 1, further comprising:

a first linear motor disposed adjacent to the loading zone; and a second linear motor disposed adjacent to the unloading zone;

wherein the permanent magnet interacts with the first linear motor to propel the shuttle onto the loading zone, and the permanent magnet interacts with the second linear motor to propel the shuttle off of the unloading zone.

5. A system configured to change elevation of a shuttle, the system comprising:

an elevator track disposed between a loading zone and an unloading zone; and a platform coupled to the elevator track and configured to move between the loading zone and the unloading zone, the platform configured to lift the shuttle at the loading zone by engaging a lower surface of the shuttle;

wherein the platform is configured to lift the shuttle off a first set of rails at the loading zone, and to position the shuttle onto a second set of rails at the unloading zone.

6. The system of claim 5, further comprising:

the loading zone, wherein the loading zone comprises at least one gap between the first set of rails, and wherein the platform is configured to pass through the at least one gap; and the unloading zone, wherein the unloading zone comprises at least one gap between the second set of rails, and wherein the platform is configured to pass through the at least gap.

7. The system of claim 6, wherein the shuttle comprises a permanent magnet, the system further comprising:

a first linear motor disposed adjacent to the loading zone; and a second linear motor disposed adjacent to the unloading zone;

wherein the permanent magnet interacts with the first linear motor to propel the shuttle onto the loading zone, and the permanent magnet interacts with the second linear motor to propel the shuttle off the unloading zone.

8. The system of claim 5, further comprising:

a coupling device that couples the platform to the elevator track, wherein the coupling device is configured to allow the platform to rotate with respect to the elevator track.

9. The system of claim 8, wherein the platform is coupled to the elevator track along a side surface of the platform.

10. The system of claim 5, wherein the platform comprises a wheel engagement portion that is configured to engage one or more wheels disposed on the lower surface of the shuttle.

11. The system of claim 5, wherein a first configuration of the loading zone is different than a second configuration of the unloading zone.

12. The system of claim 5, wherein the elevator track is a non-vertical elevator track.

13. The system of claim 5, wherein the elevator track has a central axis oriented at between 30 degrees and 60 degrees.

14. The system of claim 5, wherein the elevator track is in continuous motion during loading of the shuttle onto the platform and unloading of the shuttle off the platform.

15. The system of claim 5, wherein the platform comprises a rectangular member arranged in a wave-like geometry.

16. The system of claim 5, wherein the loading zone is disposed at a first level of a sortation system, and wherein the unloading zone is disposed at a second level of the sortation system.

17. A system for handling shuttles, the system comprising:

a rail-based track system comprising a first level and a second level;

an angled elevator track disposed between a loading zone disposed at the first level and an unloading zone disposed at the second level; and a platform coupled to the angled elevator track and configured to move between the loading zone and the unloading zone, the platform configured to lift a shuttle at the loading zone by engaging a lower surface of the shuttle positioned at the loading zone;

wherein the platform is configured to lift the shuttle off a first set of rails at the loading zone, and to position the shuttle onto a second set of rails at the unloading zone.

18. The system of claim 17, wherein the shuttle comprises a permanent magnet, the system further comprising:

the loading zone, wherein the loading zone comprises at least one gap between the first set of rails, and wherein the platform is configured to pass through the at least one gap;

a first linear motor disposed adjacent to the loading zone;

the unloading zone, wherein the unloading zone comprises at least one gap between the second set of rails, and wherein the platform is configured to pass through the at least gap; and a second linear motor disposed adjacent to the unloading zone;

wherein the permanent magnet interacts with the first linear motor to propel the shuttle onto the loading zone, and the permanent magnet interacts with the second linear motor to propel the shuttle off of the unloading zone.

19. The system of claim 17, further comprising:
a coupling device that couples the platform to the elevator track, wherein the coupling device is configured to allow the platform to rotate with respect to the elevator track;
wherein the platform is coupled to the elevator track along a side surface of the platform.

20. The system of claim 17, wherein the platform comprises a wheel engagement portion that is configured to engage one or more wheels disposed on the lower surface of the shuttle.

* * * * *